April 16, 1940.                    C. B. SCHNEIBLE                    2,197,595
                                      COLUMN
                                Filed Dec. 10, 1937                 2 Sheets-Sheet 1
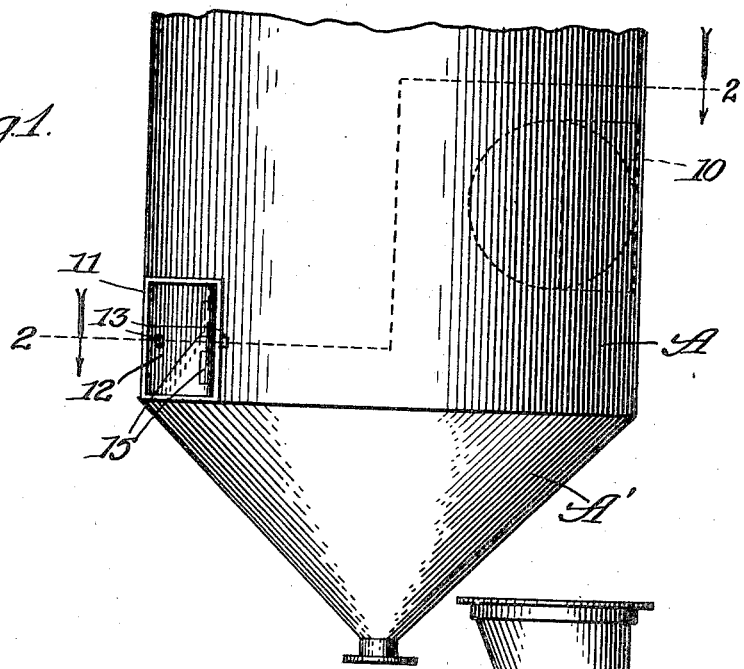
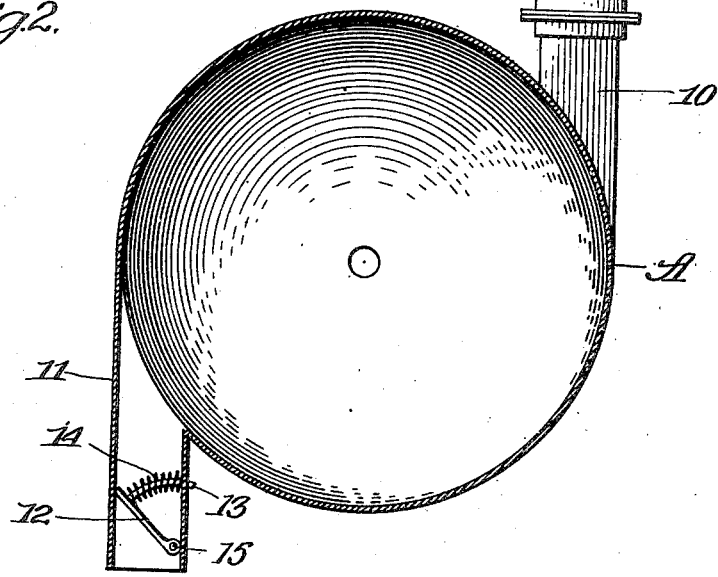
Inventor:
Claude B. Schneible,

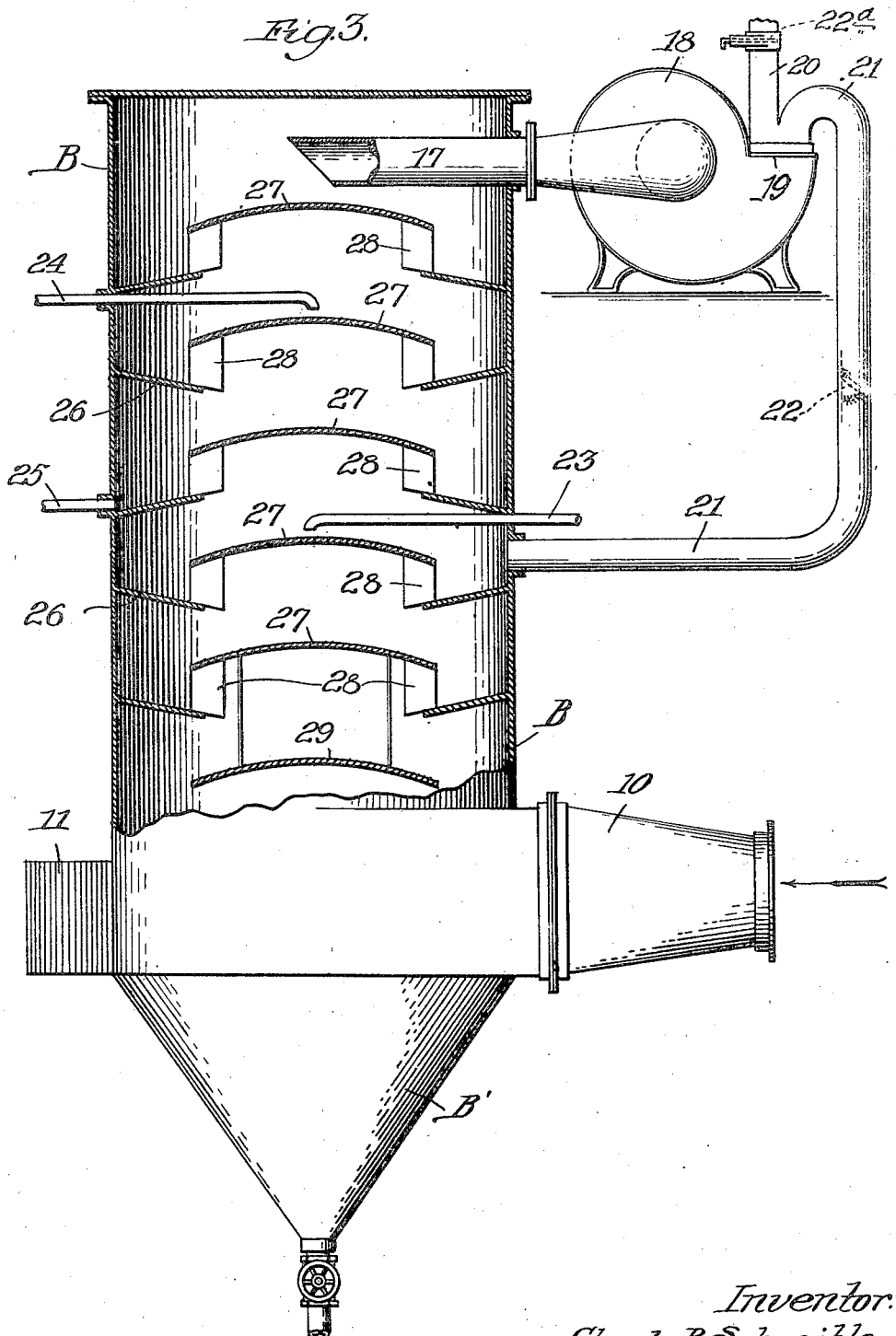

Patented Apr. 16, 1940

2,197,595

UNITED STATES PATENT OFFICE 2,197,595

COLUMN

Claude B. Schneible, Chicago, Ill.

Application December 10, 1937, Serial No. 179,202

4 Claims. (Cl. 183—40)

This invention relates to a column and means associated therewith for maintaining an even volume of flow within the column.

The column may be employed as a dust separating column, distilling column, dephlegmating tower, scrubbing tower, absorption tower, and similar towers.

An object of the invention is to provide a tower or column with means for preventing the volume passing therethrough from dropping below a predetermined volume to the end that the column will serve effectively as a dust separator, distilling column, dephlegmating tower, scrubbing tower, absorption tower, etc. A further object is to provide a pressure-responsive valve by which the volume of gas or air within the column will be increased in volume by the admission of outside air for the purpose of maintaining a desired volume within the column. A further object is to provide a column with a pressure differential-responsive valve by means of which outside air is automatically introduced into the column to maintain a predetermined volume therein. Other specific objects and advantages will appear as the specification proceeds.

The invention is illustrated, in a preferred embodiment, by the accompanying drawings, in which—

Figure 1 is a broken side view in elevation of a column embodying my invention; Fig. 2, a transverse sectional view, the section being taken as indicated at line 2 of Fig. 1; and Fig. 3, a longitudinal sectional view of a modified form of the invention.

In the illustration given, A designates a column casing provided with a tapered lower portion A'. The upper portion of the column is provided with the usual baffle ring and plates by which the air, vapor, or other gaseous material passing upwardly through the casing is given a whirling or circular motion. Such baffle plates and vanes are described in detail in my Patents No. 1,783,813 and No. 1,790,590, and also in my co-pending application Serial No. 38,634 for Column. It will be understood, however, that other types of vanes or baffle plates may be employed.

The casing A is provided near its lower portion with an inlet pipe 10, the pipe entering tangentially into the casing, thereby aiding in giving the incoming gas, air or vapors a rotary motion.

On the opposite side of the casing A is a tangentially arranged inlet 11 equipped with a valve 12 having a curved metal guide 13, a spring 14 being interposed for normally maintaining the valve closed. Under a predetermined pressure, however, the valve 12 yields against the force of spring 14 to admit air into the casing. It will be observed that the valve 12 is pivotally connected to the inlet 11 at the point 15 whereby the free end of the valve engages the outer side of the inlet 11, thereby directing or deflecting the air toward the wall of casing A. Thus the air entering through the inlet 11 is directed toward the casing A in the same direction in which the incoming air through inlet 11 passes.

In the operation of the device, air or other gas or vapors normally enter through the inlet pipe 10 and pass with a rotary motion upwardly through the tiers of vanes and plates meeting the downflowing liquid. As long as the incoming volume is sufficient, a velocity is obtained which will render the column effective for its various uses. Should, however, the volume drop through any obstruction being formed in pipe 10, etc., the volume within the column at once diminishes and efficient separation or the other desired result is not obtained. For example, if the column is being used as a means for removing dust from air, the velocity of the incoming air must be such, in passing through the vanes, as to give the necessary rotary movement. However, if the volume of the air drops below a predetermined point, it is found that this motion is not obtained and that the dust is not effectively removed from the smaller volume of air. In order to remedy this difficulty, I have found that a spring urged valve located in the inlet 11 will yield when the pressure within the chamber drops under the influence of a lower volume so that air rushes in through inlet 11 and produces the necessary volume for efficient operation.

In normal operations, I prefer to draw the air through the column because this prevents the dust and other material carried by the air from coming in contact with the fan since the dust and other abrasive materials are removed in the column before it reaches the fan. Under such operations, the valve 12 is set in the manner illustrated in Fig. 2 so as to yield when the pressure within the column reaches a predetermined point below the pressure of the air outside.

If it is desired to force the air through the column, and should the pressure within the column drop for any reason, the valve 12 will admit sufficient air to bring up the desired volume.

In the modification shown in Fig. 3, the casing B is provided with a conical lower portion B'. The casing is provided at its lower end with an inlet 16 identical with the inlet 10 of Figs. 1 and 2. The outlet 17 enters at the top of the column and communicates with pump 18. The pump 18 discharges through outlet 19 which is provided with one discharge pipe 20 leading to the atmosphere or to any other desired point and the other pipe 21 leading back to an intermediate point in the casing B. The pipe 21 is provided with a spring-controlled valve 22, substantially the same as that shown in Fig. 2. It will be understood that this may be, if desired, a hand-operated or regulatable valve. Pipe 20 may also be provided with a hand-operated valve 22ª.

Water is introduced into the lower half of the column through pipe 23. Oil or other suitable liquid is introduced into the upper portion of the column through pipe 24. The oil is drawn off through pipe 25 and may be recycled, as described more clearly in my co-pending application, Serial No. 47,488, for Column.

Supported in the column are a series of baffles of the plate and ring type. 26 designates the baffle ring and 27 the plate. Between the plates and rings are secured vanes 28 which impart a whirling or circular motion to the air, vapor, or other gaseous material passing upwardly through the casing. In the lower portion of the casing is supported a curved deflector 29 which tends to throw the water or other liquid outwardly against the lower portion of the casing.

In the operation of the modified form of column shown in Fig. 3, I introduce the make-up air into a portion about midway or just below the middle of the column. It will be understood that instead of introducing cleansed air from the pump, I may introduce at this point any outside air. By introducing the make-up air at a point well above the bottom of the column, I increase the velocity in the upper portion of the column while allowing the velocity to be low in the lower portion of the column. Also, by introducing cleansed air, the wear and tear upon the apparatus in the upper portion of the column is reduced while at the same time a better separation is effected.

In the special arrangement illustrated in Fig. 3, I circulate oil in the upper portion of the casing. By having the pipe 21 communicate with the casing B just below the division ring baffle, separating the oil section from the water section, I am able to introduce a greater volume of air into the upper portion of the casing, thereby increasing the velocity in the oil section. By this arrangement, it is possible to have a low flow in the water section and thus reduce the chance of abrasion with larger dust particles while at the same time having a higher velocity which is controlled in the oil section just above. Of course, it will be understood that the connection or pipe 21 may be at any vertical point along the column so as to control the velocity in the section just above.

Although the present invention has been described in connection with the details of a specific embodiment thereof, it is not intended that such details shall be regarded as limitations upon the scope of the invention except in so far as included in the accompanying claims, and in the accompanying claims where the words "gas," "vapor," "air," etc., are used, it will be understood that such terms are used interchangeably and in their broad sense to include all vapors, gases and the like.

I claim:

1. In a column of the character set forth adapted for the separation of dust and the like from air, said column being provided with a tangential inlet and an outlet, means associated with the outlet side of said column for drawing air therethrough, means within said column and between said inlet and outlet for separating the dust from said air, a second tangential inlet leading in the same circular direction as the first inlet and on the same side of said separating means with said first inlet, and a valve controlling said inlet and being responsive to a pressure below atmospheric within said column so as to admit air from an independent source and maintain the volume of air within said column above a predetermined volume.

2. In a column of the character set forth adapted for the separation of dust and the like from air, said column being provided with a tangential inlet and with an outlet, means communicating with the outlet of said column for drawing air therethrough, means within said column and between said inlet and said outlet for separating the dust from said air, a second tangential inlet located on the same side of said separating means with said first inlet and leading in the same circular direction as the first inlet, and a valve controlling said inlet and being responsive to a pressure below atmospheric within said column so as to admit air from an independent source and maintain the volume of air within said column above a predetermined volume.

3. In a column of the character set forth adapted for the separation of dust and the like from air, said column being provided with a tangential inlet at its outlet end and with an inlet at its upper end, suction means associated with the outlet of said column for drawing air through said inlet and through said column, means within said column and between said inlet and outlet for separating the dust from said air, a second inlet leading in the same circular direction as the first inlet and on the same side of said separating means with said first inlet, and a valve controlling said inlet and being responsive to a pressure below atmospheric within said column so as to admit air from an independent source and maintain the volume of air within said column above a predetermined volume.

4. In a column of the character set forth adapted for the separation of dust and the like from air, said column being provided with an inlet at the lower end thereof and an outlet at the upper end thereof, means associated with the outlet side of said column for drawing air therethrough, means within said column and between said inlet and said outlet for separating the dust from said air, a second inlet leading into said column on the same side of said separating means as said first outlet, and a valve controlling said inlet and being responsive to a pressure below atmospheric within said column so as to admit air from an independent source and maintain the volume of air within said column above a predetermined volume.

CLAUDE B. SCHNEIBLE.